Aug. 21, 1956 A. HEETMAN ET AL 2,760,001
COUNTER-SUPERVISING CIRCUIT ARRANGEMENT
Filed Oct. 19, 1951
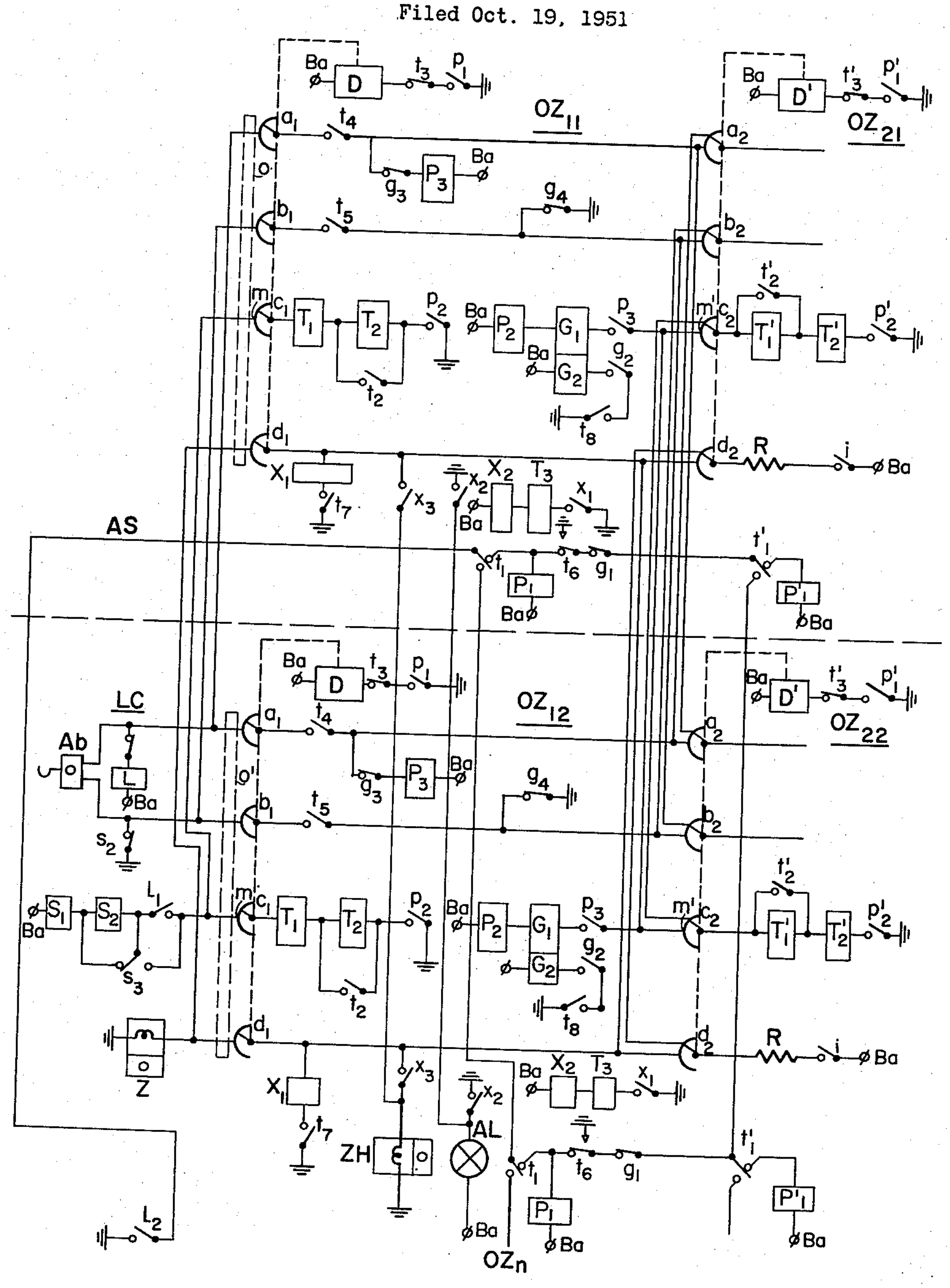
INVENTORS
ALPHONSUS HEETMAN
JAN LOUIS DE KROES
BY Fred M. Vogel
AGENT

United States Patent Office 2,760,001

Patented Aug. 21, 1956

2,760,001

COUNTER-SUPERVISING CIRCUIT ARRANGEMENT

Alphonsus Heetman and Jan Louis De Kroes, Hilversum, Netherlands, assignors to Hartford National Bank and Trust Company, Hartford, Conn., as trustee Application October 19, 1951, Serial No. 252,056

Claims priority, application Netherlands November 6, 1950

3 Claims. (Cl. 179—7)

This invention relates to a circuit-arrangement for supervising the operation of a rate counter in an automatic signalling system, for example a system for automatic telephony.

Such tariff counters are used at public exchanges to record the number of calls made by a subscriber, or more generally, to record the number of rate units for which he is to be charged. The rate counters are each associated with one of the subscribers line circuits. During a call, or at the termination of a call, the counter receives a number of counting pulses corresponding with the number of tariff units due. The position of the counter corresponding to the total number of counting pulses supplied is read periodically, for example monthly. A fault occurring, for example, due to the fact that the winding of the counter is interrupted, is generally not apparent at once, and a subscriber may continue to make calls for a prolonged time without being charged for it.

Circuit-arrangements for supervising the operation of a counter have been suggested before. Such circuit-arrangements include a supervisory relay which is generally associated with a first group selector or a connection-circuit. During the routing of counting pulses a winding of the relay is connected in parallel with a winding of the counter and the latter winding substantially short-circuits the winding of the supervisory relay, so that this relay is not responsive when the winding of the counter is in order. If the winding of the counter is interrupted, the supervisory relay energises on receipt of the first counting pulse, makes a holding circuit for itself and operates alarm means, such as an optical or acoustical signalling device. Also, under the control of the relay the various switches which are included in the connecting path between the subscriber's line and the switch with which the relay is associated are locked in the positions which they have taken up at the call so that they cannot be re-engaged. The positions of these switches consequently indicate the position at which the fault occurs. A disadvantage inherent in these known circuit-arrangements is that the subscriber's line is locked as well so that the subscriber can no longer call or be called until the fault is removed. This is particularly inconvenient in the case of non-supervised exchanges since there is here no staff to restore the fault at once so that under certain circumstances the faulty condition may be of very long duration.

The circuit-arrangement according to the invention obviates the said disadvantage, and is distinguished by the feature that supervisory means are provided in each of the first line finders of the group to an outlet from which the subscriber's line is connected, said means being responsive on the winding of the counter being interrupted, and that during response of these means an impedance is connected in parallel with a winding of the rate counter, and in addition the circuit of the pertinent first line finder is transferred to such a condition that upon termination of the call the first line finder is held locked in the position taken up and cannot be engaged during a subsequent call but the line is released again and that the impedance has such a low resistance value that upon adjustment of a further first line finder to the pertinent line the supervisory means in the other first line finder are not responsive.

In this circuit-arrangement the conversation can be normally wound up and the subscriber can again call or be called so that the subscriber himself is not aware of any fault. The position of the faulty counter is indicated by the position of the first line finder. Other instruments, such as second line finders, connection circuits or the like, are released after the conversation. At a subsequent call the impedance connected in parallel with the counter windings prevents any further first line finder from also being transferred into the alarm condition and from also being locked. The impedance is preferably formed by the winding of an auxiliary rate counter which, for example, may be common to one or more groups of first line finders.

In order that the invention may be clearly understood and readily carried into effect, it will now be described more fully with reference to one embodiment shown, by way of example, on the drawing.

LC denotes the line circuit of a subscriber A*b* which is connected to an outlet *o* for a group of first line finders $OZ_{11}$ and to an outlet O′ for a second group of first line finders $OZ_{12}$. The line finders $OZ_{11}$ and $OZ_{12}$ can be connected to connecting circuits (not shown) by the use of second line finders $OZ_{21}$ and $OZ_{22}$, respectively. For the sake of simplicity only one line finder of each group of line finders is shown. The line circuit LC includes a rate counter Z the operation of which is supervised in a manner to be described hereinafter by a supervisory relay X associated with each first line finder of the pertinent group. Several relays comprise each two or more windings. These relays are themselves not shown in the figure but are denoted by their windings. Thus, for example, the relay X comprises the windings $X_1$ and $X_2$, the relay S the windings $S_1$ and $S_2$, the relay T the windings $T_1$, $T_2$ and $T_3$ the relay T′ the windings $T'_1$ and $T''_2$ the relay P the windings $P_1$, $P_2$ and $P_3$ and relay G the windings $G_1$ and $G_2$. In view of the relay P′ only the winding $P'_1$ is shown.

The circuit arrangement operates as follows. When the subscriber A*b* lifts the receiver, the line relay L is energised in a circuit from ground via break contact $s_2$ of relay S, the line loop across the subscriber's station A*b*, break contact $s_1$ of relay S, winding of relay L to a terminal of the battery B*a*, which has a further terminal connected to ground. Make contact $l_1$ of relay L prepares an energising circuit for relay S. Make contact $l_2$ of relay L closes a starting circuit for the first line finders $OZ_{11}$ and $OZ_{12}$ and the second line finders $OZ_{21}$ and $OZ_{22}$. Now referring, by way of example, to the line finders $OZ_{11}$ and $OZ_{21}$, relay P is energised, across its winding $P_1$, in a circuit which includes make contact $l_2$, break contact $t_1$ of relay T and, if required break contact $t_1$ of relays of other line finders of the stage. Similarly, relay P′ is energised in $OZ_{21}$ across winding $P'_1$ in a circuit which includes make contact $l_2$, starting current lead AS, break contact $t_1$, break contact $t_6$, of relay T, break contact $g_1$ of relay G and break contact $t'_1$ of relay T′. The closing of make contact $p_1$ of relay P results in that the rotary magnet D of $OZ_{11}$ is magnetised and the line finder $OZ_{11}$ is actuated to hunt the calling line. At the same time the second line finder starts to hunt for the first line finder due to the fact that the rotary magnet D′ of $OZ_{21}$ is energised via make contact $p'_1$ of relay p′ and break contact $t'_3$ of relay T′. The first line finder to be found is marked in the contact bank of $OZ_{21}$ due to the fact that make contact $p_3$ of relay P is closed. As soon as the first line finder $OZ_{11}$ has reached the calling line, the relays T and S become energised in a circuit from ground via make contact $p_2$ of relay P, the windings $T_1$ and $T_2$, the test arm $c_1$ and the marking contact $m$ of $OZ_{11}$, make contact $l_1$ break contact $s_3$ of relay S, winding $S_1$ to ground. Break contact $t_3$ of relay T releases the energising circuit of rotary magnet D and the switch $OZ_{11}$ stops. Make contact $t_2$ short-circuits the high ohmic winding of relay T and as a result of the opening of break contact $s_3$ the high ohmic winding of blocking relay $S_2$ is conected in series with the low-ohmic winding $S_1$. The marking contact of $OZ_{11}$ is thus given such a voltage that the outlet is marked engaged. Make contact $s_3$ shunts the break contact $l_2$ of relay L. By reason of the opening of the break contacts $s_1$ and $s_2$ of relay S the relay L becomes de-energised.

Break contact $l_2$ of relay L removes the ground from the starting circuit AS and the change-over of the make and break contact $t_1$ of relay T results in that the starting current lead AS is connected to a next following first line finder $OZ_{12}$ of the stage. Break contact $t_1$ releases the circuit of winding $P_1$ but relay P is held energised in a circuit from ground via break contact $f_4$ of relay G, make contact $t_5$ of relay T, wiper $b_1$ of $OZ_{11}$, the subscriber's station A*b*, wiper $a_1$ of $OZ_{11}$, make contact $t_4$ of relay T, break contact $g_3$ of relay G and winding $P_3$ of relay P to battery. Relay P' is held energised via make contact $t_6$ of relay T, break contact $g_1$ of relay G and break contact $t'_1$ of relay T'.

As soon as the second line finder $OZ_{21}$ reaches the first line finder $OZ_{11}$, the test relay T' of $OZ_{21}$ in series with the busy relay G of $OZ_{11}$ is energized. The circuit extends from ground via make contact $p'_2$ of relay P', the series-connected windings $T'_1$ and $T'_2$, wiper $c_2$ and marking contact m' of $OZ_{21}$, make contact $p_3$ of relay P, winding $G_1$ and winding $P_2$. Relay P is held energised in this circuit after the energising circuit of winding $P_1$ is released by the opening of break contacts $g_3$ and $g_4$, similarly to the relays and T', until at the end of the call relay P' becomes de-energised by means (not shown) and make contact $P'_2$ opens. Break contact $t'_3$ releases the energising circuit of rotary magnet D' and the second line finder $OZ_{21}$ stops. Make contact $t'_2$ of relay T' short-circuits the high-ohmic winding T', with the result that the marking contact $m'$ is given such a voltage that the outlet for $OZ_{21}$ is marked engaged.

The sequence is similar if the line finder $OZ_{11}$, is found by $OZ_{21}$ prior to the calling line being found by $OZ_{11}$. After a connection between the calling line and the connection circuit is thus established the called subscriber is selected in known manner. As soon as the latter answers, a counting pulse is routed, by means known per se (not shown) to the charge counter Z of the calling subscriber by reason of the transient closure of the pulse contact $i$ via the circuit from battery via pulse contact $i$, resistor R, wiper $d_2$ of the engaged second line finder $OZ_{21}$, wiper $d_1$ of the engaged first line finder $OZ_{11}$, and the winding of Z to ground. The winding $X_1$ of the supervisory relay X is connected in parallel with the winding of the rate counter via make contact $t_7$ of relay T but the relay X is not energised by the counting pulse because the resistance of $X_1$ is much higher than the resistance of the winding of Z. Consequently, the winding $X_1$ is substantially short-circuited by the winding of Z and $X_1$ has passing through it only such a low current that relay X does not respond. This effect may be assisted by connecting a further winding of relay X in series with the winding of the counter or including it in the common energising circuit of Z and $X_1$ and by passing the current through the further winding in a sense opposite to that through $X_1$ so that if the winding of Z is in order the magnetisation of $X_1$ is neutralised by the current in the further winding.

Normally, the relay will consequently not respond. At the end of the call relay P' of the engaged second line finder $OZ_{21}$ becomes de-energised and by reason of the opening of contact $p'_2$ the relays T' and P are also demagnetised, whereupon break contact $p_2$ releases the energising circuit of the relays T and S and make contact $t_8$ releases the holding circuit of relay G, the circuit of $OZ_{11}$ and $OZ_{21}$ having then resumed its normal condition.

If, however, the winding of the counter is interrupted relay X becomes energised and closes a holding circuit for itself and for relay T via its make contact $x_1$, winding $T_3$ and winding $X_2$. Via make contact $x_2$ the alarm lamp AL strikes as a sign that the fault occurs and to indicate the point at which it occurs, and further alarm means may also be operated. Via make contact $x_3$ of a relay X an auxiliary rate counter ZH, which for example, may be common to a group of subscribers, is connected in parallel with the winding of the faulty counter Z so that the counting pulses are recorded by ZH.

The circuit remains in this condition up to the end of the conversation, the relay T' and P becoming de-energised by the opening of $p'_2$. However, relay T is held energised via winding $T_3$, irrespective of make contact $p_2$, and relay G is held magnetised via its winding $G_2$, its make contact $g_2$ and make contact $t_8$ of relay T. The result is consequently that only relay P has become de-energised and the relays G, T and X are held energised. In this condition the line finder $OZ_{11}$ circuit is held locked on the faulty line and thus, indicates the faulty counter by its position, $OZ_{11}$ cannot be re-engaged because contact $t_1$ remains in the operated position so that relay P no longer can be energised upon a call. However, upon the relay T' becoming de-energised the line finder $OZ_{21}$ is again released.

As a result of the opening of make contact $p_2$, relay S in the subscriber's circuit has become de-energised and the subscriber's circuit has consequently re-assumed its normal rest condition. Thus, the subscriber can make a subsequent call also in normal manner, a further first line finder $OZ_{12}$ of the group being engaged by the closure of make contact $l_2$ of line relay L. The new call connection extends entirely without the locked first line finder $OZ_{11}$. This line finder has two functions. Firstly, the position of the line finder provides an indication of the point of the faulty counter. Then, the winding of the auxiliary counter ZH is held connected in parallel with the faulty counter Z via the wiper $d_1$ of the line finder and make contact $x_3$. If consequently during a subsequent call counter pulses are routed to the counter Z, then they are recorded by ZH. In addition, the low resistance of the winding of ZH prevents the supervisory relay X in the first line finder $OZ_{12}$, across which the conversation is now exchanged, from responding and also this line finder from being locked on the subscriber's line circuit at the termination of the call.

What we claim is:

1. In an automatic signalling system, in combination, a group of first line finders having an outlet coupled to a line, means to engage one of said line finders with said line when a call is made, a tariff counter for registering the tariff units of calls made over said line, said counter being provided with a winding, means to supply counting pulses through said outlet to said counter when a call is made whereby said counter registers said tariff units and a counting current flows in said winding, an alarm device for indicating failure of current flow in said winding during the period in which a call is made, a plurality of supervisory devices, each of said supervisory devices being provided with a supervisory switch and connected to a corresponding line finder, said devices being coupled between said alarm device and said counter winding, the particular supervisory device connected to the engaged line finder actuating said alarm device upon failure of said current flow, a plurality of connecting switches connected to define switch groups, each switch group being coupled to a respective supervisory switch in a connection at which the connecting switches in the switch group connected to the supervisory switch of said particular supervisory device become locked in position when said failure takes place, and means including an impedance to shunt said counter with said impedance when said failure occurs to lock said engaged line finder in position whereby said engaged finder cannot be released during a subsequent call and said calling line is free to engage any other line finder during a subsequent call, said impedance having a resistance value at which no supervisory device of said any other line finder may actuate said alarm device.

2. An automatic signalling system as set forth in claim 1 further including an auxiliary tariff counter having an auxiliary winding, wherein said impedance is formed by said auxiliary winding.

3. An automatic signalling system as set forth in claim 2 wherein said auxiliary tariff winding is common to said group of first line finders.

References Cited in the file of this patent

UNITED STATES PATENTS

| | | |
|---|---|---|
| 1,601,053 | Williams | Sept. 25, 1926 |
| 1,778,309 | Carpenter | Oct. 14, 1930 |
| 2,196,250 | Collis | Apr. 9, 1940 |
| 2,258,980 | Eagan | Oct. 14, 1941 |
| 2,486,722 | Stehlek | Nov. 1, 1949 |